(12) United States Patent
Redmond

(10) Patent No.: US 6,284,886 B1
(45) Date of Patent: Sep. 4, 2001

(54) CEREAL BETA GLUCAN COMPOSITIONS AND METHODS OF FORMULATION

(75) Inventor: Mark J. Redmond, Edmonton (CA)

(73) Assignee: Ceapro INC, Edmonton (CA)

( * ) Notice: Subject to any disclaimer, the term of this patent is extended or adjusted under 35 U.S.C. 154(b) by 0 days.

(21) Appl. No.: 09/320,170

(22) Filed: May 26, 1999

Related U.S. Application Data

(60) Provisional application No. 60/086,955, filed on May 27, 1998.

(51) Int. Cl.$^7$ ............................. C08B 37/00; C07H 1/06
(52) U.S. Cl. .................. 536/124; 536/127; 536/123.12; 514/54
(58) Field of Search .................... 536/123.12, 124, 536/127, 114; 514/54

(56) References Cited

FOREIGN PATENT DOCUMENTS

99/61480 A1 * 12/1999 (WO) .

OTHER PUBLICATIONS

Autio, Karin. "Chapter 5—Functional Aspects of Cereal Cell Wall Polysaccharides" from Carbohydrates in Food, edited by Ann–Charlotte Eliasson, publ. by Marcel Dekker, Inc., pp. 227–264, 1996.*

* cited by examiner

*Primary Examiner*—Howard C. Lee
(74) *Attorney, Agent, or Firm*—Judy A. Erratt

(57) ABSTRACT

Simple and efficient methods for formulating cereal beta glucan compositions that retard the natural gel forming properties of hydrocolloids and remain free flowing liquids is disclosed. The method employs a biological buffer system consisting of a zwitterionic salt that will vary pH with temperature. The resulting beta glucan preparation can be used directly or stored for future use.

29 Claims, 3 Drawing Sheets

CEREAL BETA GLUCAN COMPOSITIONS AND METHODS OF FORMULATION

CROSS-REFERENCE TO RELATED APPLICATION

This application is related to provisional patent application Ser. No. 60/086,955, filed May 27, 1998, from which priority is claimed under 35 USC § 119(e)(1) and which is incorporated herein by reference in its entirety.

BACKGROUND OF THE INVENTION

1. Technical Field

The present invention relates generally to beta glucans. More particularly, the invention relates to methods and compositions for producing liquid beta glucan preparations from cereal sources.

2. Background of the Invention

Gums are either hydrophobic or hydrophilic high molecular weight substances that in an appropriate solvent produce gels or highly viscous suspensions or solutions at low dry substance content. Gums commonly used in food, medicine, and industrial products include starches, cellulose derivatives, guar gum, locust bean gum, pectin, algin, carrageenan, xanthan, beta glucan, and gum arabic, see Whistler, R. L. (1993) *Industrial Gums: Polysaccharides and Their Derivatives* Eds. Whistler R. L. and BeMiller J. N.(Academic Press) p. 2.

Most gums in a solid state consist of polysaccharide chains grouped in a disorganized manner. The random nature of this structure only partially satisfies the intermolecular interaction potential, for example hydrogen bonding potential is not saturated. The numerous unsatisfied hydrogen bonds are capable of rapid hydration, binding water molecules at hydrogen bonding positions not otherwise involved in intra- and intermolecular bonding of the polysaccharide molecules. When a polysaccharide is placed in water, the water molecules quickly penetrate amorphous regions and bind to available polymer sites, competing for and eventually reducing other interpolysaccharide bonds to negligible numbers. Segments of a polysaccharide chain become fully solvated and move away by kinetic action, tearing apart more interpolysaccharide bonds, which are immediately solvated. This intermediate stage in the dissolution of a polymer molecule represents a transient gel state and portrays a universal stage in the dissolution of all polysaccharides. For carbohydrates not fully soluble in cold water, dissolution is completed by heating with rapid mixing and results in a monodispersed hydrogel solution. Unless mechanisms are adopted to prevent reannealing, the hydrogel will form a gel on cooling.

When linear gum molecules in solution collide they form an association over several chain units. At the junctions of the chains, molecular bonding e.g. hydrogen bonds form and as the interactions spread throughout the solution a great three dimensional network is formed and the liquid becomes a gel. Once formed, a gel may undergo lengthening of junction zones as the molecules slide over each other or by moving together. This causes an overall tightening of network structure and a decrease in solvent filled spaces between molecules. Hence, the solvent is exuded from the gel to produce syneresis or weeping. Cooling or freezing a colloidal solution or gel accelerates this effect.

Industrial gums are sold as powders because of problems with solution stability. In order produce or enhance solubility, and stabilize gel solutions, gums may be chemically modified. For example addition of methyl, ethyl, carboxymethyl, hydroxyethyl, hydroxypropyl, phosphate, sulfate and similar groups enhances solubility and produces stable solutions of high viscosity. Beta glucan is classified as a viscous gum, see Wood, P. J. (1993) *Oat Bran* Ed. P. J. Wood (American Association of Cereal Chemists, Inc., St. Paul, Minn). Glucans are structural polysaccharides present in the cell wall of yeasts, bacteria, fungi, and cereals. For example, (1→3), (1→4), and mixed (1→3), (1→4) beta D glucans are found in the endosperm cell wall of such cereals as barley and oat, among others. Beta glucans affect the viscosity and hence the effectiveness of products derived from these sources. For example, beta glucans appear to influence digestion, assist in glucoregulation, and lower serum cholesterol. Cereal beta glucans are useful nutritional agents and have also been used as bulking agents in place of sucrose. Beta glucans have also been described as potent immune system stimulants and promote the healing of wounds. Yun et al., *Int. J. Parasitol.* (1997) 27:329337; Estrada et al., *Microbiol. Immunol.* (1997) 41:991998; Williams et al., (1997) U.S. Pat. No. 5,676,967. Beta glucan gels have also been used in suspending biocompatible particles for tissue injection, Lawin et al. (1995) U.S. Pat. No. 5,451,406. The cosmetics industry favors the use of beta glucan for its viscosity, shear strength and moisture enhancing properties.

The solubility properties of beta glucans differ according to their source. For example cereal beta glucans are normally soluble in aqueous solvents, whereas yeast (*Saccharomyces cerevisiae*) beta glucan are insoluble in aqueous solvents. Soluble glucans are desirable. Yeast beta glucan has been solubilized by the addition of phosphate groups, see Williams et al., *Immununopharmacol.* 22:139–156 (1991). Jamas et al., U.S. Pat. No. 5,622,939 describes methods to extract soluble beta glucan from *Saccharomyces cerevisiae*. The method described is complex involving acid hydrolysis, base hydrolysis and the extensive use of centrifugation and ultrafiltration. No details are provided as to the stability of the solubilized yeast beta glucan.

Biological buffers are characterized by their zwitterionic properties. Good's buffers (see: Good, N. E. et al., Biochemistry 5:467 (1966); Good N. E. and Izawa S. *Meth. Enzymol.* 24:Part B 53 (1972); Ferguson W. J. and Good N. E., *Anal Biochem.* 104:300 (1980)) were designed to have a pKa between 6.0 and 8.0, to have minimal salt effects due to the ionic composition of the solution, and to have minimal interactions with cations. The important feature of these buffers in relation to the stabilization of gum solutions is the temperature coefficient (pKa/C) that ensures the variation of pH with temperature. This property may be used to create both a destabilizing effect during formulation in the temperature range of 20° C. to 96° C., specifically the reversal of hydrogen bonding polarities and the transition through a zero polar, neutral state, as well as a stabilizing effect as a solution nears the critical freezing point.

DISCLOSURE OF THE INVENTION

The present invention provides for a simple and efficient method of formulating and producing stable solutions of beta glucan. The invention utilizes a biological, zwitterionic buffer during the purification process, to retard gelation and/or precipitation of the beta glucan upon cooling. The invention thus allows for greater yields of beta glucan, as well as the use of cruder cereal preparations as starting materials for purification of beta glucan.

Accordingly, in one embodiment, the invention is directed to a method for retarding gelation of a beta glucan solution.

The method comprises combining a beta glucan-containing preparation with a biological, zwitterionic buffer solution to result in a beta glucan solution, under conditions sufficient to retard gelation of the beta glucan solution when the beta glucan solution is cooled to a temperature of about 10° C. or lower.

In another embodiment, the invention is directed to a method for retarding gelation of an oat beta glucan solution when the beta glucan solution is cooled to a temperature of about 10° C. or lower. The method comprises combining an oat beta glucan preparation with a HEPES buffer solution. The HEPES buffer solution comprises a preservative and HEPES buffer at a concentration of about 2.5 mM to about 5 mM and has a pH of about 7.2.

In yet another embodiment, the invention is directed to a method for purifying a beta glucan from a beta glucan-containing cereal preparation. The method comprises:

(a) combining the preparation with a biological, zwitterionic buffer solution under conditions sufficient to disperse the beta glucan, to form a beta glucan solution; and (b) heating the beta glucan solution to produce a dispersed hydrocolloidal solution.

In preferred embodiments, the method further comprises filtering the dispersed hydrocolloidal solution to provide a clarified beta glucan solution.

In still a further embodiment, the invention is directed to a method for purifying an oat beta glucan from an oat beta glucan preparation. The method comprises:

(a) combining the preparation with a HEPES buffer solution comprising a preservative and HEPES buffer at a concentration of about 2.5 mM to about 5 mM and having a pH of about 7.2, to result in a beta glucan solution;

(b) heating the beta glucan solution to a temperature of about 54° C. to about 100° C., to produce a dispersed hydrocolloidal solution; and (c) filtering the dispersed hydrocolloidal solution to provide a clarified beta glucan solution.

In preferred embodiment, the beta glucan solution is heated to a temperature of about 60° C. to about 65° C.

In another embodiment, the invention is directed to a method for purifying a beta glucan from a beta glucan-containing cereal preparation. The method comprises:

(a) hydrating beta glucan in the cereal preparation to produce a beta glucan solution;

(b) heating the beta glucan solution to dissolve beta glucan in the beta glucan solution to provide a dispersed beta glucan solution;

(c) filtering the dispersed beta glucan solution to provide a clarified beta glucan solution; and (d) adding a biological, zwitterionic buffer solution to the clarified beta glucan solution, to provide a stabilized beta glucan solution.

In yet another embodiment, the invention is directed to a method for purifying an oat beta glucan from an oat beta glucan preparation. The method comprises:

(a) hydrating beta glucan in the oat beta glucan preparation to produce a beta glucan solution;

(b) heating the beta glucan solution to a temperature of about 75° C. to about 85° C. to dissolve beta glucan in the beta glucan solution to provide a dispersed beta glucan solution;

(c) filtering the dispersed beta glucan solution to provide a clarified beta glucan solution; and (d) adding a HEPES buffer solution to the clarified beta glucan solution, the HEPES buffer solution comprising a preservative and HEPES buffer at a concentration of about 2.5 mM to about 5 mM and having a pH of about 7.2, to provide a stabilized beta glucan solution.

In another embodiment, the invention is directed to a method for retarding precipitation of beta glucan from a beta glucan solution. The method comprises combining a beta glucan-containing preparation with a biological, zwitterionic buffer solution to result in a beta glucan solution, under conditions sufficient to retard precipitation of beta glucan from the beta glucan solution when the beta glucan solution is cooled to a temperature of about 10° C. or lower.

The biological, zwitterionic buffer solution in each of the methods above, preferably comprises a biological buffer selected from the group consisting of N-[2-Hydroxyethylpiperazine-N'-[2-ethanesulfonic acid] (HEPES), 3-[N-Morpholino]propanesulfonic acid (MOPS), N-tris[Hydroxymethyl]methyl-2-aminoethanesulfonic acid (TES), N,N-bis[2-Hydroxyethyl]-2-aminoethanesulfonic acid (BES), -N-[Carbamoylmethyl]-2-aminoethanesulfonic acid (ACES), Piperazine-N,N'-bis[2-ethanesulfonic acid] (PIPES), N-[2-Acetamido]-2-iminodiacetic acid (ADA) and 3-[N,N-bis(2-Hydroxyethyl)amino]-2-hydroxypropanesulfonic acid (DIPSO). Furthermore, the buffer solution may additionally comprise a preservative.

These and other embodiments of the subject invention will readily occur to those of ordinary skill in the art in view of the disclosure herein.

DETAILED DESCRIPTION OF THE INVENTION

Figure 1:
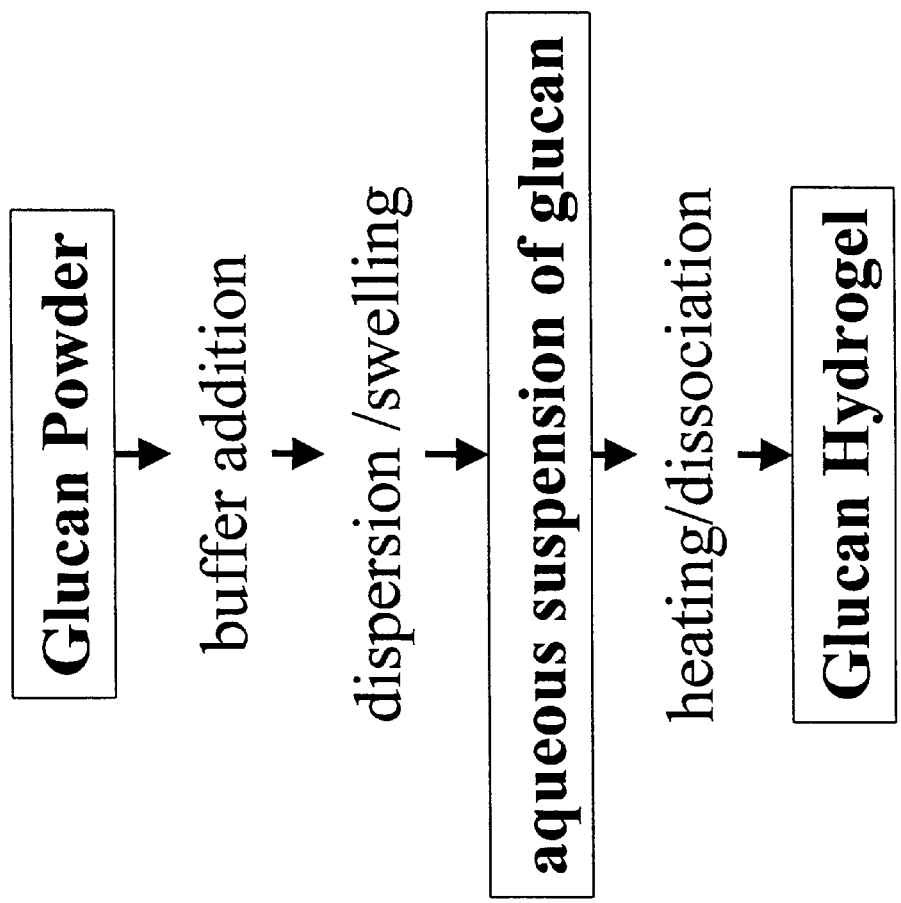
FIG. 1 is a flow diagram depicting the beta glucan procedure.

The practice of the present invention will employ, unless otherwise indicated, conventional methods of chemistry, cereal chemistry and biochemistry, within the skill of the art. Such techniques are explained fully in the literature. See, e.g., *Industrial Gums: Polysaccharides and their derivatives*, Eds. Whistler R. L. and BeMiller J. N. (Academic Press), *Oats: Chemistry and Technology* ed. Webster, F. H. (American Association of Cereal Chemists, St. Paul, Minn.), and Beynon, R. J. and Easterby, *J.S. The Basics: Buffers Solutions*.

All publications, patents and patent applications cited herein, whether supra or infra, are incorporated by reference in their entirety.

As used in this specification and the appended claims, the singular forms "a", "an", and "the" include plural references unless the content clearly indicates otherwise. Thus, the term "a beta glucan" can include more than one beta glucan.

Definitions

In describing the present invention, the following terms will be employed, and are intended to be defined as indicated below.

By "cereal" is meant any of several grains such as, but not limited to, cultivars of barley, oat, wheat, rye, sorghum, millet, and corn.

By "beta glucan" is meant a glucan with a β(1→3)-linked glucopyranosyl backbone, or a β(1→4)-linked glucopyranosyl backbone, or a mixed β(1→3)(1→4)linked glucopyranosyl backbone.

A "cereal beta glucan" or a "cereal beta glucan extract" is a beta glucan or beta glucan extract, respectively, which is derived from a cereal source.

By "biological buffer" is meant a buffer with zwitterionic properties. Such buffers provide a temperature coefficient (pKa/C) that ensures the variation of pH with temperature to create a destabilizing effect during formulation, specifically the reversal of hydrogen bonding polarities and the transition through a zero polar, neutral state. Further, these buffers provide a stabilizing effect as a solution nears the critical freezing point. Such buffers include, but are not limited to, N-[2-Hydroxyethylpiperazine-N'-[2-ethanesulfonic acid] (HEPES), 3-[N-Morpholino]propanesulfonic acid (MOPS), N-tris[Hydroxymethyl]methyl-2-aminoethanesulfonic acid (TES), N,N-bis[2-Hydroxyethyl]-2-aminoethanesulfonic acid (BES), -N-[Carbamoylmethyl]-2-aminoethanesulfonic acid (ACES), Piperazine-N,N'-bis[2-ethanesulfonic acid] (PIPES), N-[2-Acetamido]-2-iminodiacetic acid (ADA) and 3-[N,N-bis(2-Hydroxyethyl)amino]-2-hydroxypropanesulfonic acid (DIPSO); 2-[N-Morpholino] ethanesulfonic acid (MES); 3-[N-Morpholino]-2-hydroxypropanesulfonic acid (MOPSO); 3-[N-tris (Hydroxymethyl)methylamino]-2-hydroxypropanesulfonic acid (TAPSO); -N-[2-Hydroxyethyl]piperazine-N'-[2-hydroxypropanesulfonic acid] (HEPPSO); Piperazine-N,N'-bis[2-hydroxypropanesulfonic acid] (POPSO); -N'-[2-Hydroxyethyl]piperazine-N'-[3-propanesulfonic acid] (EPPS); Triethanolamine (TEA); N-tris[Hydroxymethyl] methylglycine (TRICINE); N,N-bis[2-Hydroxyethyl] glycine (BICINE); N-tris[Hydroxymethyl]methyl-3-aminopropanesulfonic acid (TAPS); 3-[(1,1-Dimethyl-2-hydroxyethyl)amino]-2-hydroxypropanesulfonic acid (AMPSO); 2-[N-Cyclohexylamino]ethanesulfonic acid (CHES); 3-[Cyclohexylamino]-2-hydroxy-1-propanesulfonic acid (CAPSO); 2-Amino-2-methyl-1-propanol (AMP); and 3-[Cyclohexylamino]-1-propanesulfonic acid (CAPS). Preferably, the buffer is HEPES, MOPS, TES, BES, ACES, PIPES, ADA or DIPSO, with HEPES preferred. All of the above buffers are readily commercially available from, e.g., Sigma (St. Louis, Mo.).

By "Good Buffer" is meant a buffer as defined by N. E. Good (Good, N. E., et al. *Biochemistry* 5:467 (1966); Good, N. E. and Izawa, S. *Meth. Enzymol.* 24:Part B 53 (1972); Ferguson, W. J. and Good, N. E., *Anal. Biochem.* 104:300 (1980)) including: MES; PIPES; BES; MOPS; TES; HEPES; EPPS; TRICINE; BICINE; CAPS; TAPS.

By "gelation" is meant the art-recognized process by which monomeric particles, such as particles present in a hydrosol (a dispersed and solubilized viscous aqueous preparation) combine with the continuous phase to form a polymeric hydrogel (an elastic material or infinite viscosity and essentially infinite weight average molecular weight). Thus, for purposes of the present invention, gelation is the process of forming a colloid in which the dispersed phase is combined with the continuous phase to produce a viscous jelly-like product.

By "retarding gelation" is meant a lowering of gel formation in the solution treated according to the invention as compared to gelation exhibited by a control solution which has not been treated with a biological, zwitterionic buffer as described herein. For example, solutions treated under the invention will typically withstand several freeze/thaw cycles, preferably at least 2–5 freeze/thaw cycles, as detailed in the examples, without appreciable gelation, precipitation, or deterioration of product quality. The term "retarding gelation" does not require that gelation be 100% inhibited.

By a "stabilized beta glucan solution" is meant a beta glucan solution treated under the invention which displays less gelation than a control solution which has not been treated with a biological, zwitterionic buffer as described herein. As explained above, such a solution will typically withstand at least 2–5 freeze/thaw cycles, without appreciable gelation, precipitation or deterioration of product quality.

By "dispersed hydrocolloidal solution" is meant a hydrocolloid preparation including solvated beta glucan particles distributed throughout an aqueous solution.

By "clarified beta glucan solution" is meant a beta glucan solution having a turbidity of less than 100 FTU (Formazine Turbidity Unit), preferably less than 50 FTU, more preferably, less than 25 FTU, even more preferably less than 12 FTU, and most preferably less than 5 FTU. See, e.g., *National Field Manual for the Collection of Water-Quality Data*. Book 9, Section A6.7 US Geological Survey (1998) for a discussion of turbidity and measurements thereof.

General Methods

Central to the present invention is the discovery of a simple and efficient method for producing stable solutions of beta glucan. The solutions typically display reduced gelation when cooled to temperatures of 10° C. or less, as compared to untreated counterparts. The methods also provide for decreased precipitation of beta glucans out of solution during purification and allow for the use of cruder starting materials. For example, methods described herein allow the use of higher molecular weight beta glucans which display increased viscosity.

The methods of the invention employ a biological buffer, which as shown herein, provides for increased stability and retards the formation of gels. The solution may be clarified to provide a clear solution for use in cosmetics and pharmaceutical preparations.

Using the methods of the present invention, it is possible to formulate beta glucan solutions in the range of 0.01 to 4% beta glucan:solvent (w/w), more usually 0.01 to 2%, even more usually, 0.1 to 1.5% beta glucan:solvent (w/w), and preferably solutions in the range 0.5 to 1% beta glucan:solvent (w/w). Thus the method described herein serve to provide for the preparation of solutions of pure beta glucan with exceptional stability and extended shelf-life.

Beta glucan from any of several known cereal sources can be used in the process of the present invention. Such cereals include, without limitation, any of the cultivars of e.g., barley, oat, wheat, rye, corn, sorghum, and millet, with barley and oat preferred because of their high beta glucan content.

Beta glucan is available in powdered form from commercial suppliers, for example, Sigma Chemical Co. (St. Louis, Mo.) and Nurture (MT). Canamino Inc. (Saskatoon, SK) supplies oat beta glucan. It is preferred that beta glucan powder of more than 85% purity and low salt content be employed in the present invention. Methods to remove protein are known to those skilled in the art, e.g. gel filtration or acid hydrolysis. Methods of removing salts are also known and are frequently employed in beta glucan preparation e.g., ethanol precipitation or ethanol washing.

For purposes of the present invention, the beta glucan can either be dispersed directly in the biological buffer, prior to further purification, or can be added to the biological buffer further downstream in the purification process, such as after a clarified and concentrated beta glucan solution has been produced. For example, providing the biological buffer in the early stages of the process allows the use of lower temperatures to disperse the beta glucan without the problem of gelation and precipitation during the purification process and provides increased stability of the purified product. Alternatively, the biological buffer may be used later in the process, also to provide enhanced stability of the ultimate product.

Generally, the buffer strength is in the range of about 0.1 mM to about 20 mM, more usually about 0.1 mM to about 10 mM, preferably about 0.5 mM to about 5 mM, more preferably about 1.0 mM to about 5 mM, most preferably about 2.5 mM. The pH of the buffer is selected to provide a neutral to slightly alkaline pH at 20° C. and will usually be in the range of about pH 6.5 to about pH 8.5, preferably about pH 7 to about pH 8, even more preferably about pH 7.0 to about pH 7.5, and most preferably pH 7.2. The biological buffer may also contain auxillary components, such as preservatives.

For example, in one embodiment, the beta glucan is dispersed and hydrated directly in the biological buffer at ambient temperature. It has been found that swelling times from 1–24 hours, more usually 4–16 hours at 10–25° C. provide for full hydration of the beta glucan. Alternatively, if the biological buffer will be provided at a later stage, the beta glucan is dispersed and hydrated in a suitable aqueous solution, such as deionized water. By monitoring viscosity to a stable end-point, using techniques well known in the art, full hydration may be assured.

Following swelling, the dispersed and hydrated beta glucan is heated to dissociate the individual carbohydrate molecules by disrupting intermolecular bonds. It has been found that heating to about 54° C. to about 100° C., preferably about 60° C. to about 90° C., preferably about 65° C. to about 85° C., most preferably about 75° C. to about 85° C., dissociates the glucan molecules. Heating time is for about 0.5 to about 12 hours, preferably about 0.5 to about 6 hours, and most preferably about 1 to about 2 hours.

After heating, it is preferable to clarify the beta glucan solution by removing large clumps of undispersed beta glucan. This may be done by filtration. For a clear product it is preferable to remove particles of the size more than 10 microns in diameter, preferably more than 4 microns in diameter, and most preferably more than 1 micron in diameter. Microparticle removal may be achieved by clarification through filters coated with a filter-aid, for example Celite. In selecting any filtration media, care must be taken not to introduce salts into the dispersed glucan solution. This requires filter pre-washing with high purity water and more preferably the use of the highest grade filter media. The clarity of the beta glucan solution is determined by assessing turbidity. In this regard, turbidity of the filter eluent is preferably monitored until a reading of less than 100 FTU (Formazine Turbidity Unit), preferably below 50 FTU, more preferably, below 25 FTU, even more preferably below 12, and most preferably below 5 FTU, is obtained. See, e.g., *National Field Manual for the Collection of Water-Quality Data*. Book 9, Section A6.7 US Geological Survey (1998) for a discussion of turbidity and measurements thereof.

Following clarification, the beta glucan solution may be concentrated using any of several methods known in the art, such as by dialysis and/or diafiltration or ultrafiltration, in order to achieve a beta glucan solution in the range of about 0.01–4% beta glucan:solvent (w/w), as described above. For example, filtration using a filter with a molecular weight cutoff of about 100,000 Daltons, will provide a final product with the desired purity.

The beta glucan content of the final extract can be determined using a number of methods, known to those skilled in the art. For example, beta glucan content can be assessed calorimetrically and/or by standard analytical techniques such as size exclusion chromatography and HPLC. See Wood et al., *Cereal Chem*. (1977) 54:524; Wood et al., *Cereal Chem*. (1991) 68:31–39; and Wood et al., *Cereal Chem*. (1991) 68:530–536. Beta glucans can also be analyzed enzymatically using commercially available kits, such as Megazyme (Ireland) employing the techniques of McCleary and Glennie-Holmes *J Inst. Brew*. (1985) 91:285.

C. Experimental

Below are examples of specific embodiments for carrying out the present invention. The examples are offered for illustrative purposes only, and are not intended to limit the scope of the present invention in any way.

Efforts have been made to ensure accuracy with respect to numbers used (e.g. amounts, temperatures, etc.) but some experimental error and deviation should, of course be allowed for.

Methods to disperse gums are well known in the art, see *industrial Gums: Polysaccharides and Their Derivatives*, Eds. Whistler, R. L. and BeMiller, J. N. (Academic Press) 3rd Edition p. 18. Specialized equipment is also available from manufactures specifically for the dispersion and hydration of gels e.g., Henkel Corp. and Quadro, Inc.

Viscosities are measured with a rotational, shear-type viscometer such as the Brookfield SyncroLectric or the Haake Rotovisco. Methods of using the instrument are known to those skilled in the art. Routinely, measurements are made at four speeds of disc rotation at a constant temperature of 20° C.

HEPES buffer (acid and potassium salt) was obtained from Sigma Chemical Co. (St. Louis, Mo.). One hundred times concentrated buffer stock solutions were prepared following the formulas provided by Dr. R. J. Beynon UMIST, Manchester, UK see Beynon R J and Easterby J S. The Basics:Buffers Solutions.

A preservative system consisting of Killatol™ solution was purchased from Collaborative Labs (NJ). Filter media Celite Hyflo Super-Cel and acid washed Super-Cel was obtained from World Minerals (CA). Specialized filters and filtration media were obtained from Hilliard Star Systems Division (NC).

A freeze/thaw system for evaluating colloidal solution stability was developed. A 25 ml sample of the colloidal solution or gel was placed in a −18° C. freezer and left in the freezer until frozen solid. The sample was next allowed to warm to ambient temperature (+18° C.). After reaching ambient temperature the sample was examined for gelling and/or syneresis. The number of cycles to produce gelling/syneresis was recorded. A sample of 1% beta glucan formulated in 10 mM phosphate buffer was utilized as a positive control. This sample gelled in one cycle of freeze thawing. Commercial samples of Ostaro Glucan 1A (Oat beta glucan formulated in water) obtained from Canamino Inc. gelled in a maximum of three cycles.

EXAMPLE 1

Laboratory Preparation of Stabilized 1% Beta Glucan Solution

Oat beta glucan powder, more than 85% pure, was obtained from Canamino Inc. (Saskatoon, SK, Canada). The beta glucan was sieved through a 450 micron screen and only material passing through the sieve was used for solution preparation. The amount of beta glucan to produce a final concentration of 1% was calculated accounting for purity and moisture content in the powder. The required volume of 2.5 mM HEPES buffer pH 6.0 was placed in a beaker and a vortex established with an overhead mixer. A preservative system of 2.5% KILLITOL™, a formulation consisting of 42.5% glycerin, 42.5% butylene glycol, 7.5% chlorphenesin, and 7.5% methyl paraben and 0.4% potassium sorbate was added, resulting in a solution pH of 7.2. The beta glucan powder was slowly sifted into buffer and allowed to mix for two hours. Without adjusting the vortex, the solution was heated to 55–60° C. for one hour. The 1% beta glucan solution was allowed to cool. The solution had a translucent appearance and a pH of 7.2. Samples were subjected to freeze/thaw testing using a control of 1% beta glucan in 10 mM phosphate pH 7.0. Results indicated that the control beta glucan solution gelled after one freeze/thaw cycle. The stabilized beta glucan solution underwent five cycles without deterioration of product quality.

EXAMPLE 2

Laboratory Preparation of Visually Clear, Stabilized 1% Beta Glucan Solution

The preparation proceeded as described in Example 1 with the exception that the solution was filtered after the completion of the heating step.

The filtration consisted of a standard laboratory vacuum filtration apparatus. The filter bed was prepared to ensure purity of the final product. The filter consisting of Celite Hiflo Super-Cel was prewashed with distilled water. The warm beta glucan solution was filtered through the filter bed twice. The resulting solution had a turbidity of less than 11 FTU. The solution had a translucent appearance and a pH of 7.2. Samples were subjected to freeze/thaw testing using a control of 1% beta glucan in 10 mM phosphate pH 7.0. Results indicated that the control beta glucan solution gelled after one freeze/thaw cycle. The stabilized beta glucan solution underwent five cycles without deterioration of product quality.

EXAMPLE 3

Production Plant Production of Clear, Stabilized 0.5% Beta Glucan Solution

Figure 2:
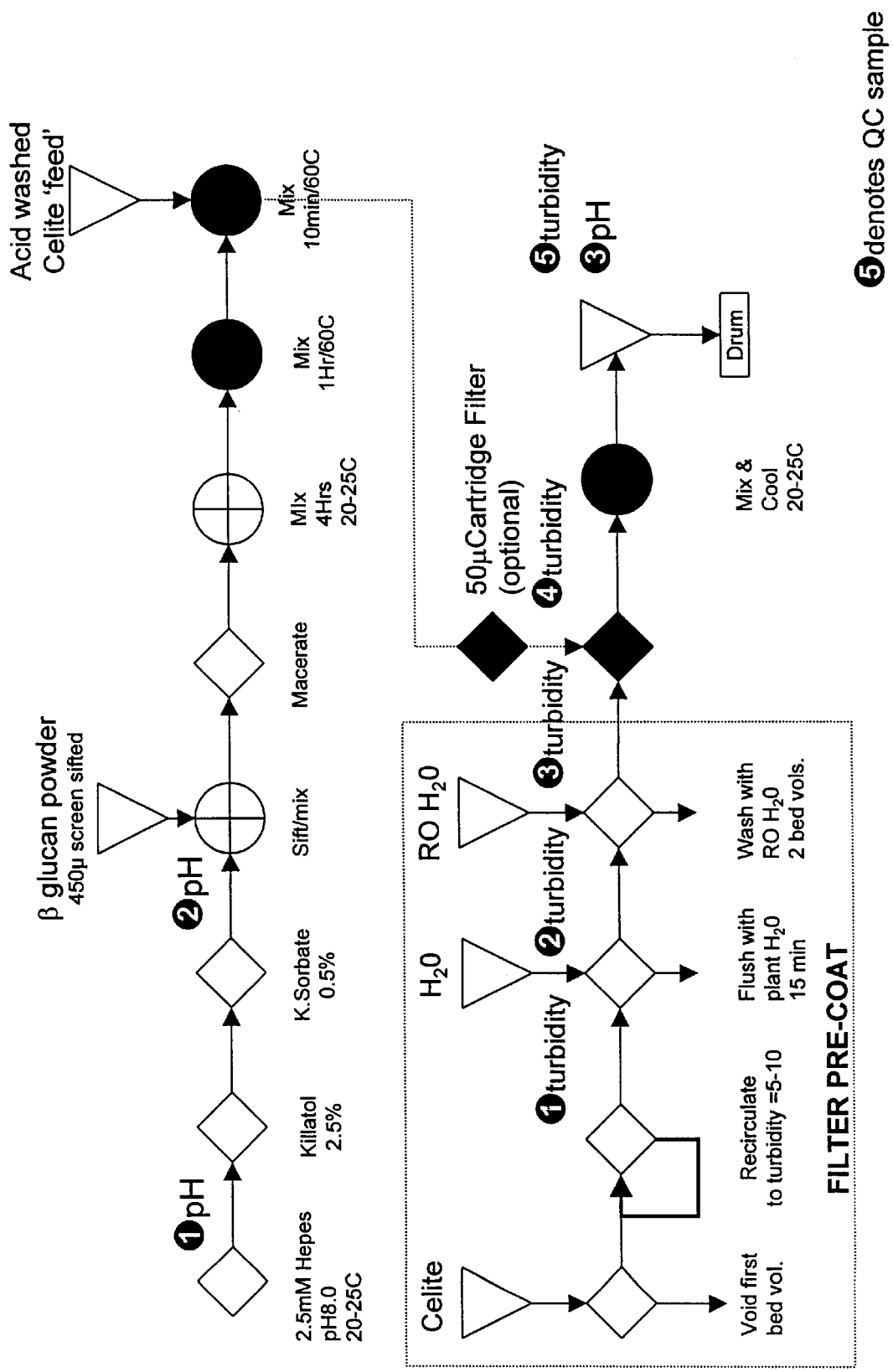
FIG. 2 is a process flow diagram showing a commercial method for producing beta glucan solutions. Small circles and numbers denote quality control points.

A production flow diagram is illustrated in FIG. 2. Oat beta glucan powder, more than 85% pure, was obtained from Canamino Inc. (Saskatoon, SK, Canada). The beta glucan was sieved through a 450 micron screen and only material passing through the sieve was used for solution preparation. The amount of beta glucan to produce 200 liters of a beta glucan solution with a final concentration of 0.5% was calculated accounting for purity and moisture content in the powder. The required volume of 2.5 mM HEPES buffer pH 8.0 was placed in a mixing tank equipped with a side mounted, overhead stirrer. A vortex was established and the preservative system of 2.5% KILLITOL™, a formulation consisting of 42.5% glycerin, 42.5% butylene glycol, 7.5% chlorphenesin, and 7.5% methyl paraben and 0.4% potassium sorbate was added resulting in a solution pH of 7.2.

The beta glucan powder was added using a powder dispersal unit and macerator (fitted with close fitting macerator heads) placed in series. The solution was allowed to mix and hydrate for four hours. Without adjusting the vortex, the solution was heated to 60–65° C. for one hour.

A plate and frame filter press was prepared with pre-coat of Celite Hiflo Super-Cel following the instructions supplied by World Minerals Inc. The bed was washed with plant process water until a turbidity of less than 5 FTU was obtained. The filter bed was then washed with a further two bed volumes of reverse osmosis purified water.

A "feed" of pharmaceutical grade Celite HifLo, consisting of an equal weight of Celite to the initial weight of beta glucan powder, was added to the beta glucan solution in the mixing vessel and dispersed by mixing for 10 minutes. The solution was then pumped through the filter bed and cycled until a turbidity of less than 5 FTU units was obtained.

Samples were then subjected to freeze thaw cycling. Results indicated that the control beta glucan solution prepared in 10 mM phosphate buffer pH 7.0 gelled after one freeze/thaw cycle. The stabilized beta glucan solution underwent five cycles without deterioration of product quality.

EXAMPLE 4

Figure 3:
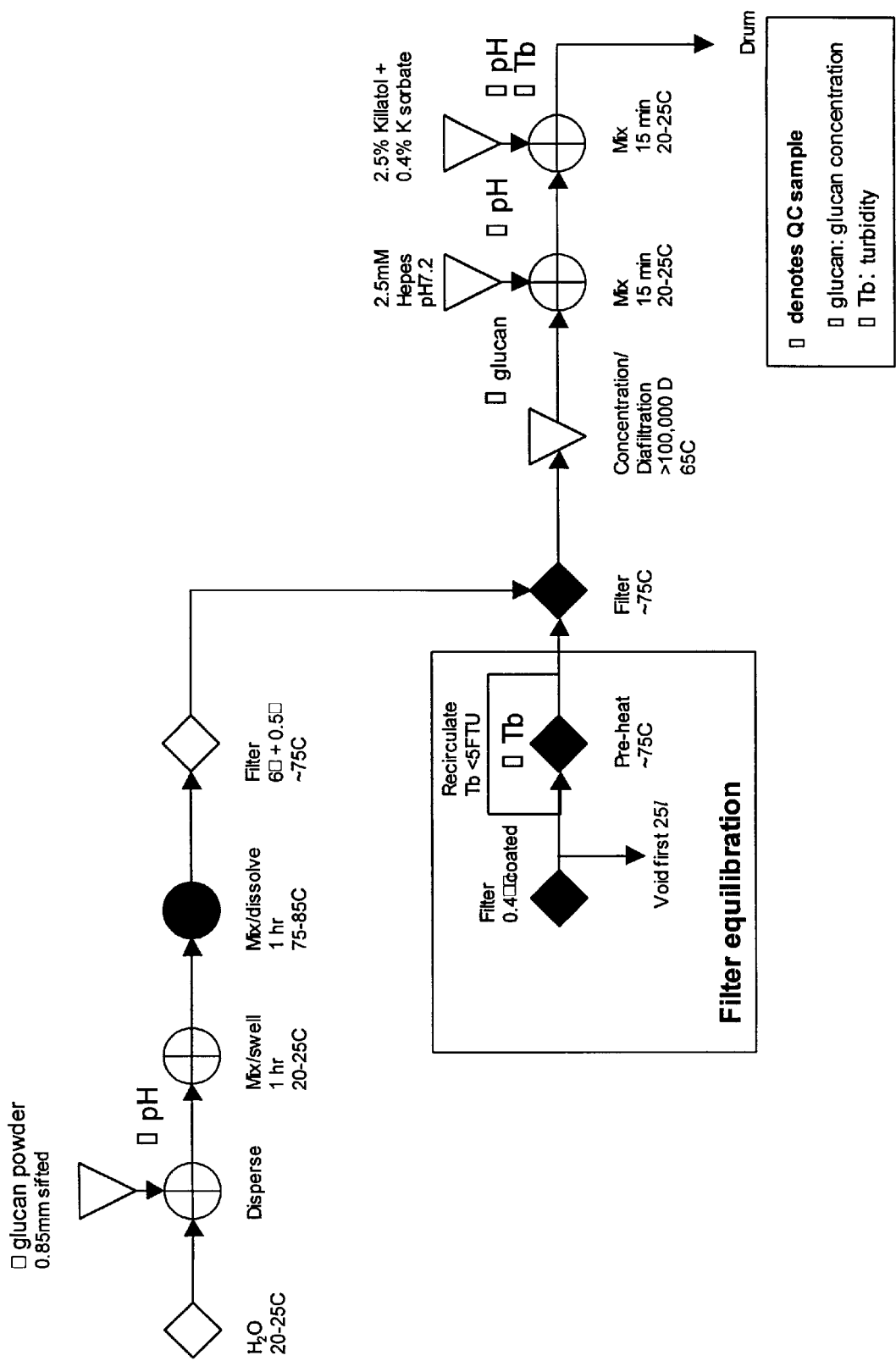
FIG. 3 is a process flow diagram showing an alternative commercial method for producing beta glucan solutions. Small circles and numbers denote quality control points.

Production Plant Production of High Viscosity, Stabilized, 1% Beta Glucan Solution A product-ion flow diagram is illustrated in FIG. 3. Oat beta glucan powder (68% purity) with a molecular weight more than 1,000,000, was sieved through a 0.85 mm screen (US #20 sieve) and only material passing through the sieve was used for solution preparation. The amount of beta glucan to produce 60 liters of a beta glucan solution with a final concentration of 1.0% was calculated accounting for purity and moisture content of the powder.

All equipment was sanitized prior to use using standard chemical reagents following FDA requirements and the US Code of Federal Regulations.

The required volume of deionized water to produce a 0.2% beta glucan working solution (300 liters) was placed in a mixing tank equipped with a centermounted, overhead mixer, and provision for heating.

The beta glucan was added to the powder holder of a Quadro "ZC" Powder Dispersion Unit and dispersed into the deionized water. Tank mixing to filly hydrate the glucan was continued for one hour at ambient temperature (~20° C.). Mixing speed was adjusted to a maximum without forming a vortex. The pH of the preparation was measured at pH 7.4. After full hydration was obtained, the temperature of the mixture was increased to approximately 85° C. and maintained for one hour. Mixing was continued as maximum without forming a vortex. After one hour the beta glucan was fully dissolved.

A plate and frame filter press (Hilliard, Star® Systems Division) was prepared for filtration using 6 micron and 0.5 micron filters placed in series, and then pre-heated to approximately 75° C. The beta glucan solution was passed through the filter press into a staging tank maintained at 85° C.

The plate and frame filter was equipped with Star Systems 0.4 micron Glisten-n-glo® filters; the filters were washed with 25 liters of plant process water, and then equilibrated by recirculating hot deionized water through the filter system until a turbidity of less than 5 FTU was obtained and the temperature of the unit reached approximately 75° C. The beta glucan solution was pumped through the filter-press at minimal pressure. In this manner a turbidity of less than 10 FTU was obtained.

Diafiltration was utilized to concentrate the beta glucan to a 1% w/w solution. A De Danske Sukkerfabrikker ultrafiltration system was equipped with polysulphone membranes with an approximate cut-off value molecular weight of 100,000.

Operating at a temperature of 65° C. the beta glucan solution was concentrated to 1.1%.

To complete the formulation, 250 mM HEPES buffer solution pH 7.2 was added to the glucan solution to produce a final HEPES concentration of 2.5 mM, pH 7.2. The preservative system of 2.5% KILLITOL™, a formulation consisting of 42.5% glycerin, 42.5% butylene glycol, 7.5% chlorphenesin, and 7.5% methyl paraben and 0.4% potassium sorbate was added next. Quality control samples were taken for microbiological analysis, turbidity measurement, and pH check. An additional sample was taken and subjected to freeze-thaw cycling. The preparation showed stability through five cycles of freeze-thaw.

The above-described procedure allows the use of a high viscosity beta glucan starting material to produce a 1% solution and employs dilute solutions for the salvation and filtration steps. This method may be used to increase the final concentration to up to 4% glucan. The method also allows for the use of low percentage beta glucan solutions as the feedstock since the diafiltration allows for buffer exchange and concentration, as well as the loss of contaminating protein with molecular weights higher than 100,000 Daltons.

Thus, novel methods for producing beta glucans are disclosed. Although preferred embodiments of the subject invention have been described in some detail, it is understood that obvious variations can be made without departing from the spirit and the scope of the invention as defined by the appended claims.

What is claimed is:

1. A method for retarding gelation of a cereal beta glucan solution, said method comprising combining a cereal beta glucan-containing preparation with a biological, zwitterionic buffer solution to result in a cereal beta glucan solution, under conditions sufficient to retard gelation of the cereal beta glucan solution when the cereal beta glucan solution is cooled to a temperature of about 10° C. or lower.

2. The method of claim 1, wherein said biological, zwitterionic buffer solution comprises a biological buffer selected from the group consisting of N-[2-Hydroxyethylpiperazine-N'-[2-ethanesulfonic acid] (HEPES), 3-[N-Morpholino]propanesulfonic acid (MOPS), N-tris[Hydroxymethyl]methyl-2-aminoethanesulfonic acid (TES), N,N-bis[2-Hydroxyethyl]-2-aminoethanesulfonic acid (BES), N-[Carbamoylmethyl]-2-aminoethanesulfonic acid (ACES), Piperazine-N,N'-bis[2-ethanesulfonic acid] (PIPES), N-[2-Acetamido]-2-iminodiacetic acid (ADA) and 3-[N,N-bis(2-Hydroxyethyl)amino]-2-hydroxypropanesulfonic acid (DIPSO).

3. The method of claim 2, wherein said biological, zwitterionic buffer solution comprises HEPES buffer.

4. The method of claim 3, wherein said HEPES buffer is present in a concentration of about 2.5 mM to about 5 mM.

5. The method of claim 1, wherein said cereal beta glucan preparation is an oat preparation.

6. The method of claim 1, wherein the biological, zwitterionic buffer solution further comprises a preservative.

7. The method of claim 6, wherein the pH of the biological, zwitterionic buffer solution is about 7.2.

8. A method for retarding gelation of an oat beta glucan solution when the beta glucan solution is cooled to a temperature of about 10° C. or lower, said method comprising combining an oat beta glucan preparation with a HEPES buffer solution, said HEPES buffer solution comprising a preservative and HEPES buffer at a concentration of about 2.5 mM to about 5 mM and having a pH of about 7.2, to result in a beta glucan solution.

9. A method for transforming a beta glucan from a beta glucan-containing cereal preparation, said method comprising:

(a) combining said preparation with a biological, zwitterionic buffer solution under conditions sufficient to disperse said beta glucan, to form a beta glucan solution; and (b) heating said beta glucan solution to produce a dispersed hydrocolloidal solution.

10. The method of claim 9, further comprising filtering the dispersed hydrocolloidal solution to provide a clarified beta glucan solution.

11. The method of claim 9, wherein said biological, zwitterionic buffer solution comprises a biological buffer selected from the group consisting of N-[2-Hydroxyethylpiperazine-N'-[2-ethanesulfonic acid] (HEPES), 3-[N-Morpholino]propanesulfonic acid (MOPS), N-tris[Hydroxymethyl]methyl-2-aminoethanesulfonic acid (TES), N,N-bis[2-Hydroxyethyl]-2-aminoethanesulfonic acid (BES), N-[Carbamoylmethyl]-2-aminoethanesulfonic acid (ACES), Piperazine-N,N'-bis[2-ethanesulfonic acid] (PIPES), N-[2-Acetamido]-2-iminodiacetic acid (ADA) and 3-[N,N-bis(2-Hydroxyethyl)amino]-2-hydroxypropanesulfonic acid (DIPSO).

12. The method of claim 11, wherein said biological, zwitterionic buffer solution comprises HEPES buffer.

13. The method of claim 12, wherein said HEPES buffer is present in a concentration of about 2.5 mM to about 5 mM.

14. The method of claim 9, wherein said cereal preparation is an oat preparation.

15. The method of claim 9, wherein the biological, zwitterionic buffer solution further comprises a preservative.

16. The method of claim 15, wherein the pH of the biological, zwitterionic buffer solution is about 7.2.

17. The method of claim 10, wherein said beta glucan solution is heated to a temperature of about 54° C. to about 100° C.

18. A method for transforming an oat beta glucan from an oat beta glucan preparation, said method comprising:

(a) combining said preparation with a HEPES buffer solution comprising a preservative and HEPES buffer at a concentration of about 2.5 mM to about 5 mM and having a pH of about 7.2, to result in a beta glucan solution;

(b) heating said beta glucan solution to a temperature of about 54° C. to about 100° C., to produce a dispersed hydrocolloidal solution; and (c) filtering the dispersed hydrocolloidal solution to provide a clarified beta glucan solution.

19. The method of claim 18, wherein said beta glucan solution is heated to a temperature of about 60° C. to about 65° C.

20. A method for transforming a beta glucan from a beta glucan-containing cereal preparation, said method comprising:

(a) hydrating beta glucan in said cereal preparation to produce a beta glucan solution;

(b) heating said beta glucan solution to dissolve beta glucan in said beta glucan solution to provide a dispersed beta glucan solution;

(c) filtering the dispersed beta glucan solution to provide a clarified beta glucan solution; and (d) adding a biological, zwitterionic buffer solution to said clarified beta glucan solution, to provide a stabilized beta glucan solution.

21. The method of claim 20, wherein said biological, zwitterionic buffer solution comprises a biological buffer selected from the group consisting of N-[2-Hydroxyethylpiperazine-N'-[2-ethanesulfonic acid]

(HEPES), 3-[N-Morpholino]propanesulfonic acid (MOPS), N-tris[Hydroxymethyl]methyl-2-aminoethanesulfonic acid (TES), N,N-bis[2-Hydroxyethyl]-2-aminoethanesulfonic acid (BES), N-[Carbamoylmethyl]-2-aminoethanesulfonic acid (ACES), Piperazine-N,N'-bis[2-ethanesulfonic acid] (PIPES), N-[2-Acetamido]-2-iminodiacetic acid (ADA) and 3-[N,N-bis(2-Hydroxyethyl)amino]-2-hydroxypropanesulfonic acid (DIPSO).

22. The method of claim 21, wherein said biological, zwitterionic buffer solution comprises HEPES buffer.

23. The method of claim 22, wherein said HEPES buffer is present in a concentration of about 2.5 mM to about 5 mM.

24. The method of claim 20, wherein said cereal preparation is an oat preparation.

25. The method of claim 20, wherein the biological, zwitterionic buffer solution further comprises a preservative.

26. The method of claim 25, wherein the pH of the biological, zwitterionic buffer solution is about 7.2.

27. The method of claim 10, wherein said beta glucan solution is heated to a temperature of about 75° C. to about 85° C.

28. A method for transforming an oat beta glucan from an oat beta glucan preparation, said method comprising:
    (a) hydrating beta glucan in said oat beta glucan preparation to produce a beta glucan solution;
    (b) heating said beta glucan solution to a temperature of about 75° C. to about 85° C. to dissolve beta glucan in said beta glucan solution to provide a dispersed beta glucan solution;
    (c) filtering the dispersed beta glucan solution to provide a clarified beta glucan solution; and
    (d) adding a HEPES buffer solution to the clarified beta glucan solution, the HEPES buffer solution comprising a preservative and HEPES buffer at a concentration of about 2.5 mM to about 5 mM and having a pH of about 7.2, to provide a stabilized beta glucan solution.

29. The method of claim 28, further comprising concentrating the clarified beta glucan solution to provide a concentrated solution in the range of 0.01 to 4% beta glucan-:solvent (w/w), prior to adding the HEPES buffer solution.

* * * * *